United States Patent [19]

Allard

[11] 4,027,540

[45] June 7, 1977

[54] INERTIAL OPTICAL STABILIZER

[75] Inventor: Frederick C. Allard, Mystic, Conn.

[73] Assignee: The United States of America as represented by the Secretary of the Navy, Washington, D.C.

[22] Filed: Mar. 21, 1975

[21] Appl. No.: 561,017

[52] U.S. Cl. .................................. 74/5.1; 74/5.22; 74/5.6 A; 33/275 G; 33/318; 356/149

[51] Int. Cl.² ........................................ G01C 19/24

[58] Field of Search ............... 74/5.22, 5.6 A, 5.1; 33/275 G, 318; 356/149

[56] References Cited

UNITED STATES PATENTS

| | | | |
|---|---|---|---|
| 2,177,094 | 10/1939 | Carter et al. | 33/275 G |
| 2,470,773 | 5/1949 | Haskins, Jr. | 74/5.6 A |
| 2,505,819 | 5/1950 | Wrigley | 356/149 |
| 2,567,053 | 9/1951 | Catravas | 33/275 G |
| 2,905,371 | 4/1955 | Hammond, Jr. | 74/5.22 X |
| 3,097,299 | 7/1963 | Rasmussen | 74/5.6 A |
| 3,205,718 | 9/1965 | Wierenga et al. | 74/5.22 |
| 3,522,993 | 8/1970 | Gabriet | 74/5.1 |

Primary Examiner—Samuel Scott
Assistant Examiner—Randall Heald
Attorney, Agent, or Firm—Richard S. Sciascia; Arthur A. McGill; Prithvi C. Lall

[57] ABSTRACT

Gyroscope instrumentation for providing stabilization of the direction of a line-of-sight of more than 45° about one or more axes is described utilizing a two axes optical system. An inner gimbal supports a gyro rotor and a first mirror diagonal with a clearance window to admit light. The gyro rotor keeps the first mirror aligned in a fixed direction relative to an inner gimbal axis. The inner gimbal is supported by an outer gimbal. The outer gimbal has a second mirror mounted on it. The gyro rotor keeps the second mirror aligned with the outer gimbal axis. The net effect is that the optical axis at the input has a fixed orientation in space and the optical axis at the output axis has a fixed orientation relative to a platform on which the system is mounted.

2 Claims, 2 Drawing Figures

INERTIAL OPTICAL STABILIZER

STATEMENT OF GOVERNMENT INTEREST

The invention described herein maybe manufactured and used by or for the Government of the United States of America for governmental purposes without the payment of any royalties thereon or therefore.

BACKGROUND OF THE INVENTION

The present invention generally relates to a line of sight stabilizing system and more particularly to an optical gyro system for stabilizing the direction of the system's line-of-sight in relation to a fixed platform that is moving in relation to the gyro.

Gyro systems utilized for providing a fixed line-of-sight are well known in the art. They have been used in association with cameras and eye pieces. In the usual system the camera or eye piece is mounted directly to the gyro itself and revolves relative to a stationary platform to keep a fixed line-of-sight. Obviously the gyro itself must be large to accommodate such equipment. Additionally in the case of an eyepiece, such as a telescope, it becomes difficult for an observer to view through a lens subject to the shifting of the gyro system in relation to the platform on which the observer is standing.

Other line-of-sight systems compute changes in direction and apply these errors to an object to compensate for changes in direction. Such devices are complex and require expensive and highly sophisticated equipment.

SUMMARY OF THE INVENTION

It is therefore a general object and purpose of the present invention to provide an improved line-of-sight stabilizing system. It is a further object that the inventive device is suitable for providing line-of-sight to a device mounted on a rigid platform exterior to the stabilizing system itself. Further objects are that the system be light in weight, low in cost, less complex than previous systems and be able to provide stabilization for deviations up to ±45° about one or more axes.

These and other objects of the invention and the various features and details of construction and operation will become apparent from the specification and drawing.

This is accomplished in accordance with the present invention by providing a gyro system having optical reflectors mounted on two or more axes for providing a line-of-sight to a platform mounted device. The reflectors are mounted to each of the gyro axes and are positioned so as to reflect an incoming or outgoing beam onto all mirrors sequentially and then to reflect the beam onto fixed incoming or outgoing positions.

DESCRIPTION OF THE PREFERRED EMBODIMENT

Figure 1:
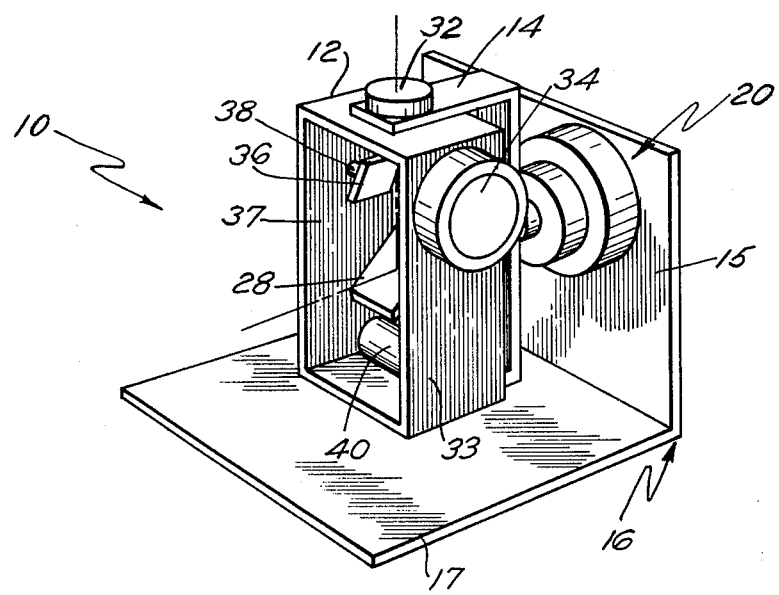
FIG. 1 shows a view of an inertial optical stabilizer of the present invention.
Figure 2:
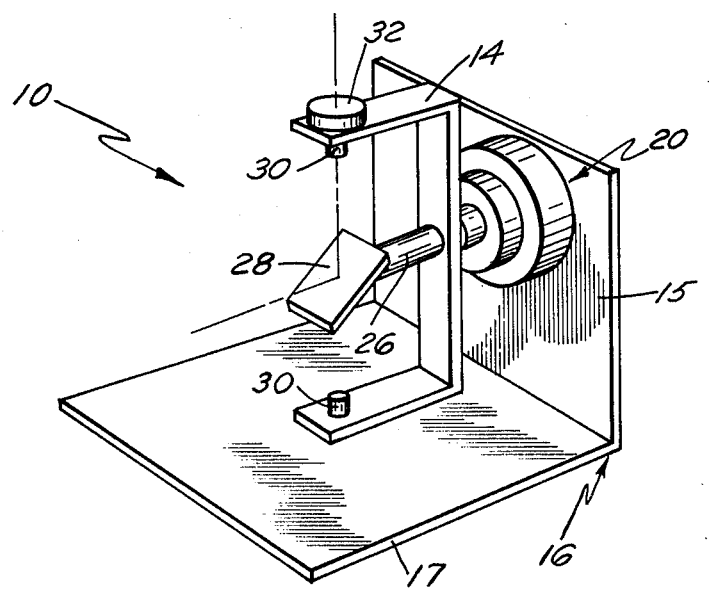
FIG. 2 shows a view of the device of FIG. 1 with the inner gimbal removed.

Referring now to the figures, there is shown generally an inertial optical gyro system 10, in the caged position, having an inner gimbal 12 and an outer gimbal 14. In the caged position the inner 12 and outer gimbal 14 are orthogonal to each other. The outer gimbal 14 is mounted on the vertical planar section 15 of a platform 16. The platform 16 has in addition a horizontal planar section 17 perpendicular with and joining to section 15. A bearing assembly 20 having a cylindrical step configuration is connected to platform 16. The assembly 20 includes the usual mechanical bearing for outer gimbal 14. The assembly 20 of gyro 10, in addition normally contains state-of-the-art devices such as a commutator, torquer and caging mechanism. A circular shaped rod 26 is connected to outer gimbal 14 and lies in a horizontal plane on the axis on which outer gimbal 14 rotates. The gimbal 14 connects at only one location to platform 16 through bearing assembly 20. Connected to rod 26 is a reflecting mirror 28 that is rectangular in shape and is located in a plane with an elevation of 45° with the circular shaped rod 26. The mirror's plane has a horizontal trace perpendicular to rod 26 when the gyro system 10 is in the caged position.

Connecting outer gimbal 14 to inner gimbal 12 are bearing supports 30. On top of outer gimbal 14 is a torquer 32. The inner gimbal 12 is box shaped and has on a sidewall 33 a circular window 34. Window 34 is aligned so that its axis is perpendicular to the axis on which inner gimbal 12 rotates. A reflective mirror 36 is mounted to inner gimbal 12 on a sidewall 37 which is located opposite to that of the sidewall 33 having window 34. The plane of mirror 36 contains a horizontal line perpendicular to the axis of window 34. In addition the plane of mirror 36 passes through the inner gimbal 12 axis forming a 45° angle. A gyro rotor 40 is connected to the base of inner gimbal 12.

Referring now to FIG. 1 it can be seen that incoming light rays parallel to the axis of window 34 will be reflected off of mirrors 36 and 28 into a horizontal position parallel to the bottom horizontal section 17 of platform 16. The reverse of this is also true in that light rays parallel to horizontal section 17 directed toward mirror 28 will be emitted through window 34 with the rays parallel to the axis of window 34. It is to be observed that the above is true regardless of the position of the inner and outer gimbals, whether caged or uncaged to a deflection in excess of ±45° from the caged position about the inner and outer gimbal axes, through which the system is operative.

There has therefore been described an optical system suitable for mounting on a platform that is subject to the pitch and roll motion found on a ship. The system can be used as a passive beam stabilizer with no servo-electronics required. In addition, it can be utilized in two way optical communication wherein rotation of the beam on its own axis becomes inconsequential. For use with a telescope the system can have a beam derotation device installed.

It will be understood that various changes in the details, materials, steps and arrangements of parts, which have been herein described and illustrated in order to explain the nature of the invention, may be made by those skilled in the art within the principle and scope of the invention as expressed in the appended claims.

I claim:

1. A line-of-sight stabilization system comprising:
   a platform;
   an outer gimbal comprising a U-shaped element with said element rotatably connected at a point equidistant from its ends to said platform;

an inner gimbal rotatably connected to said outer gimbal, said inner gimbal having a first wall connected to said outer gimbal, a second wall parallel to and spaced from said first wall, said second wall being connected to said outer gimbal, a third wall connected to said first and second walls, and a fourth wall containing an aperture, said fourth wall being spaced from and parallel to said third wall, said fourth wall connected to said first and second walls;

a first mirror fixedly connected to said outer gimbal so as to rotate with said outer gimbal, said first mirror being connected at an angle of substantially 45° with the inner gimbal axis;

a second mirror fixedly connected to said third wall of said inner gimbal so as to rotate with said inner gimbal, said second mirror being connected at an angle of substantially 45° with the outer gimbal axis; and a rotor connected to said inner gimbal for stabilizing each of said inner and outer gimbals in a fixed direction.

2. A line-of-sight stabilization system according to claim 1
wherein said platform further comprises:
a horizontal planar section; and
a vertical planar section connected to said horizontal planar section and to said outer gimbal.

* * * * *